United States Patent
Chukka et al.

(10) Patent No.: US 9,369,881 B1
(45) Date of Patent: Jun. 14, 2016

(54) MODIFICATION OF ANTENNA DIPOLE ELEMENT ORIENTATION FOR ENHANCED RADIO TRANSMISSION

(71) Applicant: SPRINT COMMUNICATION COMPANY L.P., Overland Park, KS (US)

(72) Inventors: Chaitanya Chukka, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/542,084

(22) Filed: Nov. 14, 2014

(51) Int. Cl.
| | |
|---|---|
| H01Q 3/00 | (2006.01) |
| H04W 16/28 | (2009.01) |
| H01Q 3/01 | (2006.01) |
| H01Q 9/16 | (2006.01) |
| H01Q 3/02 | (2006.01) |
| H04W 88/08 | (2009.01) |
| H04B 1/40 | (2015.01) |

(52) U.S. Cl.
CPC ............... *H04W 16/28* (2013.01); *H01Q 3/01* (2013.01); *H01Q 3/02* (2013.01); *H01Q 9/16* (2013.01); *H04B 1/40* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 3,943,517 A * | 3/1976 | Vogt | ..................... | H01Q 21/245 342/362 |
| 6,400,335 B1 * | 6/2002 | Weaver | ................... | H01Q 1/246 342/372 |
| 6,421,005 B1 * | 7/2002 | Weaver | ................... | H01Q 1/246 342/367 |
| 6,522,897 B1 * | 2/2003 | Martek | ................... | H01Q 1/246 455/561 |
| 6,832,070 B1 * | 12/2004 | Perry | .................. | H04B 7/18547 348/E7.06 |
| 8,032,135 B1 * | 10/2011 | Redford | ................. | H04W 4/021 455/431 |
| 8,779,976 B2 | 7/2014 | Eom et al. | | |
| 2001/0008393 A1 * | 7/2001 | Valio | ..................... | G01S 5/0045 342/357.42 |
| 2005/0157683 A1 * | 7/2005 | Ylitalo | .................. | H04B 7/0634 370/334 |
| 2007/0296548 A1 * | 12/2007 | Hall | ....................... | H03J 1/0008 340/10.1 |
| 2008/0311851 A1 * | 12/2008 | Hansen | ............... | H04W 72/048 455/41.2 |
| 2012/0064841 A1 * | 3/2012 | Husted | ................. | H01Q 21/205 455/78 |
| 2012/0220313 A1 * | 8/2012 | Li | .......................... | H04W 64/00 455/456.1 |
| 2012/0281783 A1 * | 11/2012 | Cheng | .................. | H04B 7/0456 375/295 |

* cited by examiner

*Primary Examiner* — Dominic Rego

(57) ABSTRACT

Methods and systems are provided for dynamically changing an orientation of dipole elements on an antenna associated with a wireless communications network. A reference signal is received at a base station from a user device that indicates an angle of arrival corresponding to the user device. Based on the angle of arrival and other factors, it is determined that a first pair of dipole elements having a first orientation is to be moved to have a second orientation. By way of a motorized element, first pair of dipole elements is physically moved from the first orientation to the second orientation.

20 Claims, 4 Drawing Sheets

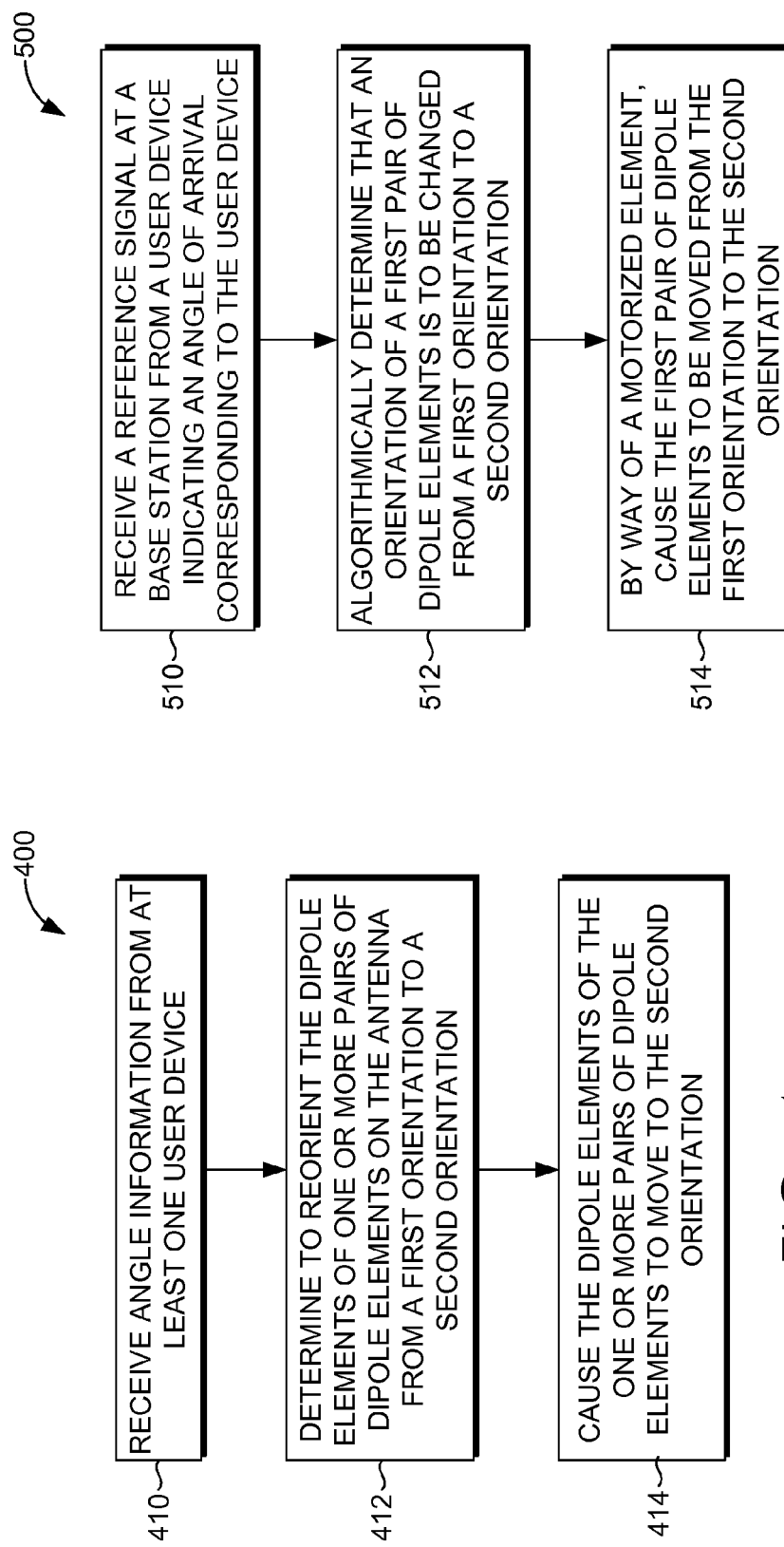

US 9,369,881 B1

MODIFICATION OF ANTENNA DIPOLE ELEMENT ORIENTATION FOR ENHANCED RADIO TRANSMISSION

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, systems and methods for dynamically determining whether and how to reorient dipole elements in an antenna based on various factors, including angle information received from at least one user device. The antenna dipole elements are caused to be physically moved to a different position corresponding to a different orientation so that the polarization of the dipole elements is as close as possible to the polarization of the user device.

BRIEF DESCRIPTION OF THE DRAWINGS

Illustrative embodiments of the present invention are described in detail below with reference to the attached drawing figures, and wherein:

FIGS. 4-5 depict flow diagrams of exemplary methods of dynamically changing an orientation of dipole elements on an antenna associated with a wireless communications network, in accordance with embodiments herein.

DETAILED DESCRIPTION

Figure 1:
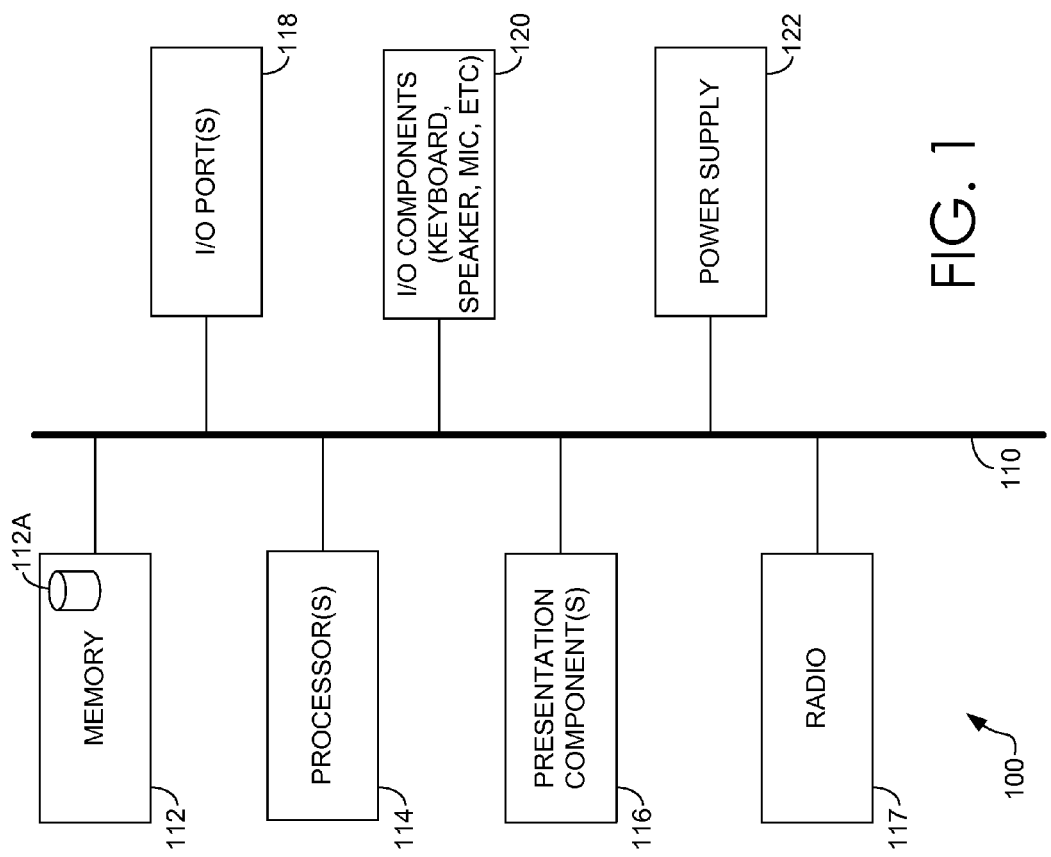
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| BS | Base Station |
| CDMA | Code Division Multiple Access |
| eNodeB | Evolved Node B |
| GPRS | General Packet Radio Service |
| GSM | Global System for Mobile Communications |
| LTE | Long-Term Evolution |
| RF | Radio-Frequency |
| RRU | Remote Radio Unit |
| WCDMA | Wideband Code Division Multiple Access |

Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Embodiments of the present invention are directed towards dynamically determining, in real-time, whether antenna dipole elements are to be moved to a different position corresponding to a different orientation based on various factors. Because of the network efficiencies gained when a user device and the antenna dipole elements have the same or similar polarization, embodiments described herein provide for the antenna dipole elements to be moved have a polarization that better matches that of one or more user devices currently being served by a base station. In one embodiment, the position of the dipole elements is modified based on the angle of arrival of a user device. The user device sends out a sounding reference signal including information about its location and/or angle, which can then be decoded by the base station to determine the phase angle to provide the most efficient communication to the user device. The dipole elements, which are typically cross-polarized, or in an "X" formation, can be controlled by digital motors based on input and/or feedback from the user device. The dipole elements may accordingly be separated to move into different orientations, such as a vertical or horizontal polarization. Since the dipole columns are connected and lined up, all elements in a column may move together.

More specifically, based on one or more parameters communicated from a user device to a base station, the base station may determine that the user devices would experience better signal strength, data transfer rates, and overall quality when a different orientation is used by which to transmit and receive RF signals. For example, while a first orientation of the dipole elements on an antenna may be cross-polarized, a second orientation of horizontal parallel may be determined to be the best orientation at that time for a particular user device, based on one of a plurality of factors considered by the base station. For instance, the new set of antenna array elements may have a different angular orientation as compared to the set of antenna array elements that was previously used to transmit and receive the RF signals. The base station or some other network component may utilize an algorithm to take into consideration one or more factors to make the determination that the dipole elements in a particular column of an antenna are to be physically moved to better accommodate a current orientation of a user device. This may occur when antennas of one or more user devices are oriented at an angle different from that of the dipole elements. For example, in one embodiment, dipole elements are moved to a different orientation based on information corresponding to a single user device. Alternatively, dipole elements may be moved to a different orientation based on information corresponding to multiple user devices, such as user devices that are in the same geographical area. For example, dipole elements may be moved to a different orientation when the majority of the user devices are currently being used for data as compared to voice, or vice versa. The angular orientation of the dipole elements is adjusted in an effort to more closely match the angle at which one or more user device antennas are being used, thereby resulting in improved RF signal parameters, including faster data rates and decreased interference. In other words, because the angular orientations of the radiating elements more closely approximate each other, there is improved signal strength and/or quality at the mobile devices.

Other advantages of the angular orientations of the dipole elements and the user devices more closely approximating each other include an enhanced reception between user devices and base stations, which greatly improves the quality of experience of the subscribers of the user devices. There is also significant improvement in network performance and throughput speeds. Deployment of antennas becomes more flexible. While typically morphology, user density, and altitude are factors taken into consideration when determining which type of antenna dipole elements to utilize at a particular base station, when embodiments described herein are employed, these factors are taken into consideration when it is determined which orientation of the dipole elements is optimal at a particular time, for a particular user device or user devices. Additionally, less RF planning and optimization is needed, and there is a better understanding of RF propagation through clutter and user device movement.

Accordingly, in a first aspect, a computerized method carried out by at least one server having one or more processors for dynamically changing an orientation of dipole elements on an antenna associated with a wireless communications network is provided. The method includes receiving angle information from at least a first user device, the angle information indicating the angle of arrival corresponding to the at least the first user device. Further, the method includes, based on at least the received angle information, determining to reorient the dipole elements of one or more pairs of dipole elements on the antenna from a first orientation to a second orientation. The first orientation provides a different polarization of the one or more pairs of dipole elements than the second orientation. The method additionally includes, by way of a signaling message communicated to a movement mechanism, causing the dipole elements of the one or more pairs of dipole elements to be moved to the second orientation.

In a second aspect, one or more computer-storage media are provided having computer-executable instructions embodied thereon that, when executed, perform a method for dynamically changing an orientation of dipole elements on an antenna associated with a wireless communications network. The method includes receiving a reference signal at a base station from a user device indicating an angle of arrival corresponding to the user device. Further, based on the angle of arrival and one or more of a type of data that the user is requesting, an elevation of the user device, a topology of an area corresponding to a location of the user device, or a distance of the user device from the base station, the method includes algorithmically determining that a first pair of dipole elements having a first orientation is to be moved to have a second orientation. The method also includes, by way of a motorized element, causing the first pair of dipole elements to be physically moved from the first orientation to the second orientation.

In a third aspect, a system is provided for dynamically changing an orientation of a plurality of dipole elements that comprise an antenna associated with a wireless communications network. The system includes a base station in the wireless communications network, the base station receiving angle information from at least one user device and determining, based on the received angle information, whether two or more antenna dipole elements of the plurality of dipole elements are to be moved from a first orientation to a second orientation. The system also includes two or more antenna dipole elements whose position in relation to one another can be changed based on, at least, the angle information received at the base station. Further, the system includes a signal-receiving component that receives a signal from the base station instructing the position of at least one of the two or more antenna dipole elements to be changed, and a movement mechanism that causes, based on the received signal, the at least one of the two or more antenna dipole elements to be moved according to the second orientation.

Referring to the drawings in general, and initially to FIG. 1 in particular, a block diagram of an illustrative mobile device according to one embodiment is provided and referenced generally by the numeral 100. Although some components are shown in the singular, they may be plural. For example, the user device 100 might include multiple processors or multiple radios, etc. As illustratively shown, the user device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that the memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

The processor 114 might actually be multiple processors that receive instructions and process them accordingly. The presentation component 116 includes the likes of a display, a speaker, as well as other components that can present information (such as a lamp (LED), or even lighted keyboards).

Numeral 117 represents a radio(s) or antenna that facilitates communication with a wireless-telecommunications-network including, for example, a base station or eNodeB associated with the wireless-telecommunications-network. Illustrative wireless-telecommunications technologies include CDMA, GPRS, TDMA, GSM, and the like. The radio/antenna 117 might additionally or alternatively facilitate other types of wireless communications including Wi-Fi, WiMAX, LTE, or other VoIP communications. As can be appreciated, in various embodiments, the radio/antenna 117 can be configured to support multiple technologies and/or multiple radios/antennas can be utilized to support multiple technologies.

The input/output port 118 might take on a variety of forms. Illustrative input/output ports include a USB jack, stereo jack, infrared port, proprietary communications ports, and the like. The input/output components 120 include items such as keyboards, microphones, speakers, touch screens, and any other item usable to directly or indirectly input data into the user device 100. The power supply 122 includes items such as batteries, fuel cells, or any other component that can act as a power source to power the user device 100.

Figure 2:
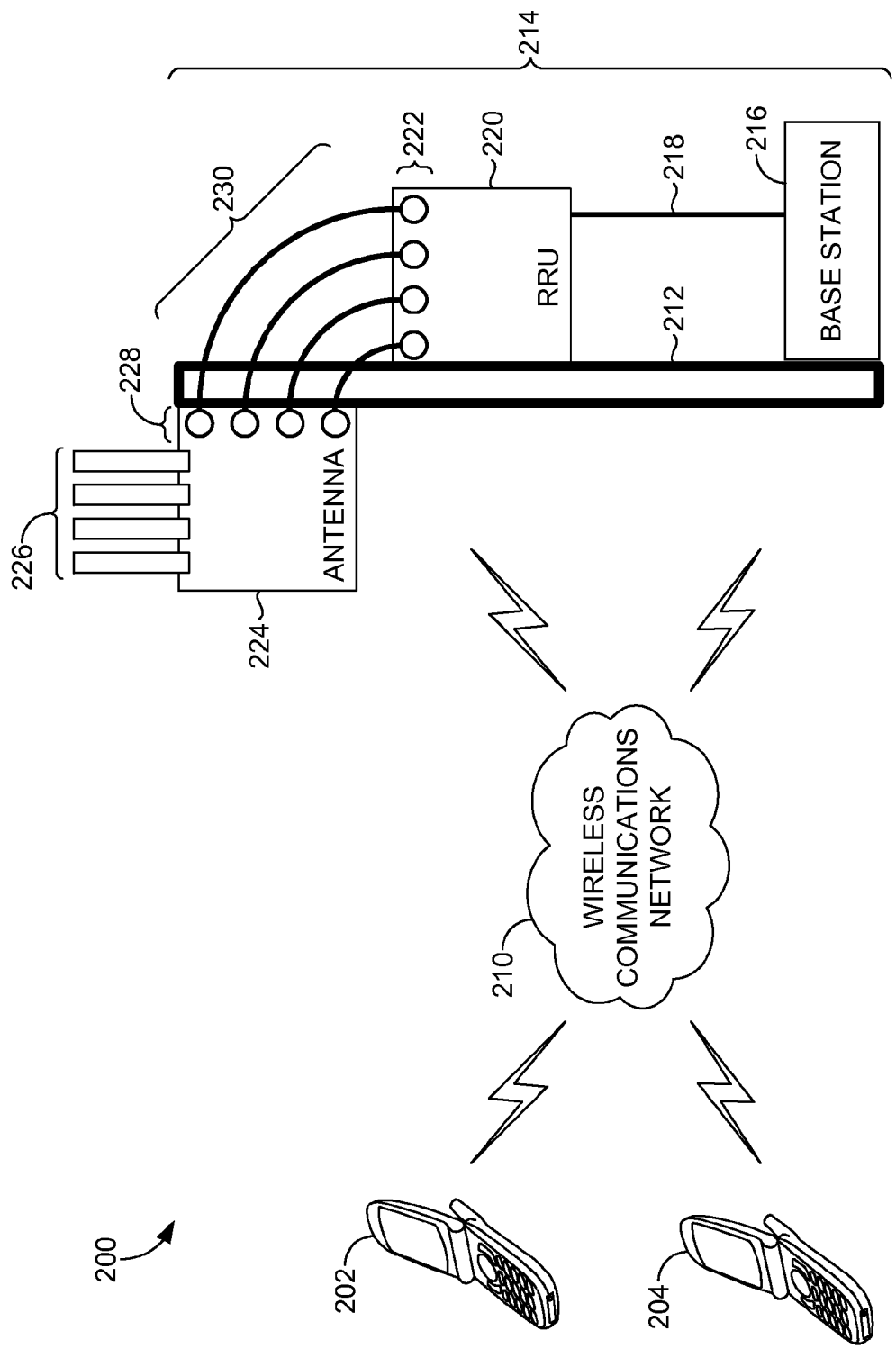
FIG. 2 depicts an illustrative operating system for use in practicing an embodiment of the technology.

Turning to FIG. 2, an illustrative operating system is depicted for use in practicing an embodiment of the technology, and is generally referred to herein as environment 200. Environment 200 is but one example of a suitable environment and is not intended to suggest any limitation as to the scope of use or functionality of embodiments herein. Neither should the environment be interpreted as having any dependency or requirement relating to any one or combination of components illustrated.

By way of background, a base station, such as an eNodeB in an LTE telecommunications network, is composed of, among other components, a broadband unit (BBU) that is connected to one or more remote radio units (RRUs). In turn, each RRU is typically connected directly to one or more antenna ports associated with an antenna located on the base station. In general, the BBU is responsible for, among other things, digital baseband signal processing. For instance, CDMA/EVDO and LTE Internet protocol (IP) packets are received from the core network and are digitally combined by the BBU. The blended digital baseband signal is then transmitted to the RRU. Digital baseband signals received from the RRU are demodulated by the BBU and the resulting IP packets are then transmitted by the BBU to the core network.

The RRU transmits and receives wireless RF signals. The RRU converts the blended digital signal received from the BBU into an analog RF output via a digital to analog (AD) converter. The analog signal is then amplified by an amplifier in the RRU and sent out for transmission to a mobile device via the antenna ports. The RF signals received from the mobile device via the antenna ports are amplified by the RRU and converted to digital baseband signals for transmission to the BBU.

In the environment 200, two user devices 202 and 204 are illustrated, and are able to communicate with other user devices (e.g., a mobile device(s), a server(s), a personal computer(s), etc.) and/or with a base station, such as the base station 216, by way of wireless communications network 210. Wireless communications network 210 might include an array of devices or components, some of which are not shown so as to not obscure more relevant aspects of the invention. Components such as terminals, links, and nodes (as well as other components) can provide connectivity in some embodiments. The network 210 can include multiple networks, as well as being a network of networks, but is shown in more simple form so as to not obscure other aspects of the present invention. The network 210 can be part of a telecommunications network that connects subscribers or users to their immediate service provider. In embodiments, the network 210 can be associated with a telecommunications provider that provides services to mobile devices, such as the user devices 202 and 204. For example, the network 210 may provide voice and/or data services to mobile devices or corresponding users that are registered to utilize the services provided by a telecommunications provider. The network 210 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA). Network 210 might be a single network or multiple networks, as well as being a network of networks. A network(s) might comprise, for example, a cable network, an Intranet, the Internet, a wireless network (e.g., a wireless telecommunications network), or a combination thereof or portions thereof.

While two user devices 202 and 204 are illustrated in environment 200, it should be understood that any number of user devices may communicate with cell tower 214 by way of wireless communications network 210. For instance, in some geographical areas, some radio towers may serve large quantities of user devices, while in other areas, radio towers may serve smaller quantities of user devices. As such, the quantity illustrated in environment 200 is shown just for exemplary purposes, and is not meant to limit embodiments presented herein in any way. A user device, as used herein, is a device that has the capability of using a wireless communications network. A user device may take on a variety of forms, such as a personal computer (PC), a laptop computer, a tablet, a mobile phone, a personal digital assistant (PDA), a server, or any other device that is capable of communicating with other devices using a wireless telecommunications network. In one embodiment, a user device is the user device described in relation to FIG. 1 herein.

A radio tower is typically a tall structure designed to support an antenna(s) for telecommunications and/or broadcasting. A radio tower is not intended herein to be limited to any shape and/or structure. For example, a radio tower 212 may be a building or pole on which a transmitting antenna is installed. In other embodiments, a mobile radio tower may be employed.

As illustrated in FIG. 2, the radio tower 212 includes or is associated with a base station 216, a remote radio unit (RRU) 220, and an antenna 224. Collectively, these components are referred to as a cell tower 214. In embodiments, base station 216 is a wireless communications station that is installed at a fixed location, such as near the base of the radio tower 212. In other embodiments, base station 216 is a mobile base station. The base station 216 is used to communicate as part of a wireless communications network 210. For example, base station 216 facilitates wireless communication between user devices 202 and 204, and a network(s). The base station 216 may, in an LTE network, be known as an eNodeB. The communication between the base station 216 and the network 210 may involve receiving RF signals from the user devices 202 and 204 using antenna array elements and transmitting RF signals to the user devices 202 and 204 using the antenna array elements. The components of environment 200 have been illustrated separately but may, in fact, be integrated into a single component.

The base station 216 can communicate with the RRU 220. In embodiments, RRU 220 is a transceiver or includes a transceiver configured to receive and transmit signals or data. In some embodiments, the RRU 220 is integrated with the base station 216. In other embodiments, as illustrated in FIG. 2, the RRU 220 is remote from the base station 216. In such an embodiment, the base station 216 can communicate with the RRU 220, for example, using a data transmission path 218, such as a fiber optic cable.

Although the RRU 220 is illustrated at or near the top of the radio tower 212, as can be appreciated, the RRU 220 can be installed in any number of locations and such an installation location is not intended to limit the scope of embodiments of the present invention. For example, the RRU 220 can be installed at or near the bottom of the radio tower 212, in the center of the radio tower 212, integrated with the base station 216, or the like.

The RRU 220 generally communicates with the antenna 224. In this regard, the RRU 220 is used to transmit signals or data to the antenna 224 and receive signals or data from the antenna 224. Communications between the RRU 220 and the antenna 224 can occur using any number of physical paths. A physical path, as used herein, refers to a path used for transmitting signals or data. As such, a physical path may be referred to as a radio frequency (RF) path, a coaxial cable path, cable path, or the like.

As such, RRU 220 includes one or more ports 228 used to connect one or more physical paths 230 to one or more ports 222 on the RRU 220. For instance, a first port can connect a first physical path to a radio, a second port can connect a second physical path to the radio, a third port can connect a third physical path to the radio, and a fourth port can connect a fourth physical path to the radio.

The antenna 224 is used for telecommunications. Generally, an antenna is an electrical device that converts electric power into radio waves and converts radio waves into electric power. The antenna 224 is typically positioned at or near the top of the radio tower 212. Such an installation location, however, is not intended to limit the scope of embodiments of the present invention.

The antenna 224 includes two or more antenna dipole columns 226. While four antenna dipole columns 226 are illustrated in FIG. 2, any number of antenna dipole columns 226 is contemplated to be within the scope of the present invention. For instance, instead of four, eight antenna dipole columns 226 could be utilized. Each column may include one or more pairs of dipole elements. The pairs of dipole elements are described in further detail in regard to FIGS. 3A-3D herein.

In one embodiment, user device 202 communicates its own angle information to the base station 216 by way of the network 210. The angle information may comprise an angle of arrival associated with the user device 202. Angle of arrival measurement is a method for determining the direction of propagation of an RF wave incident on an antenna array. Angle of arrival has been used to determine a geolocation of user devices, and may also be used in embodiments herein to determine an angle of the user device so that it can be determined which orientation of dipole elements is optimal. In one instance, angle of arrival determines the direction by measuring the time difference of arrival at individual elements of an antenna array. From these delays, the angle of arrival may be computed. As described herein, the user device 202 may communicate the angle information in the form of a reference signal. In addition to angle information, location information may also be provided to the base station.

Other factors may also be taken into consideration by an algorithm used by the base station or some other network component to determine an optimal orientation of the antenna dipole elements. For exemplary purposes only, some of these elements may include a type of data that the user is requesting, the elevation or altitude of the user device compared to the elevation or altitude of the base station, the topology of an area corresponding to a location of the user device (e.g., rural or urban area), a distance of the user device from the base station, user density, and the like. As mentioned, some of these factors weigh more heavily in favor of a particular orientation of the dipole elements, while other factors weigh more heavily in favor of other orientations of the dipole elements.

In an embodiment, base station 216 receives angle information from at least one user device and determines, based on the received angle information, whether two or more antenna dipole elements of the plurality of dipole elements are to be moved from a first orientation to a second orientation. The antenna dipole elements in the antenna dipole columns 226 have a position in relation to one another that can be changed based on, at least the angle information sent by the user device. Other factors, as will be discussed further herein, may also be used to make the determination as to whether and how the dipole elements are to be moved. A signal-receiving component may be utilized to receive a signal from the base station or other network component instructing the position of the antenna dipole elements to be changed. Based on the signal sent to the signal-receiving component, a movement mechanism causes the antenna dipole elements to be moved to a position corresponding to a different orientation.

As mentioned above, a movement mechanism may be utilized that allows the antenna dipole columns 226 or the dipole elements that comprise the columns to move based on the signaling message sent by the base station. For instance, in one embodiment, the movement mechanism includes a railing. The antenna dipole columns or dipole elements may be positioned on a railing, such as a railing that would allow the dipole elements to move to different positions, such as those illustrated in FIGS. 3A-3D herein. The railing may utilize railing slides, small wheels, etc. One or more of the antenna dipole columns or individual dipole elements may have an associated drive (e.g., gear, motor, or screw drive). Additionally, the movement mechanism may include an electro-mechanical pulley system to change the position of the columns or dipole elements when the signaling message is received. Even further, the motor may cause gears to turn, thus adjusting the position of the antenna dipole columns or dipole elements. As can be appreciated, there are many different ways to cause the antenna dipole columns or dipole elements to move from a first position to a second position corresponding to a first orientation and a second orientation, respectively. Other methods are contemplated to be within the scope of the present invention. For instance, the motor may have threads that are threaded one direction for one of the antenna dipole columns or one dipole element, and threaded in the other direction for another column or dipole element. When the motor spins, the motor causes both columns to pull in or to push out. In embodiments, the motor is located at the bottom of the cell tower. But in other embodiments, more than one motor may be used, both either being at the bottom, at the top, or a combination thereof. As can be appreciated, each dipole element in a column may be capable of being moved individually, or all dipole elements in a column, or at least the first dipole element in each pair, may move together.

Figure 3B:
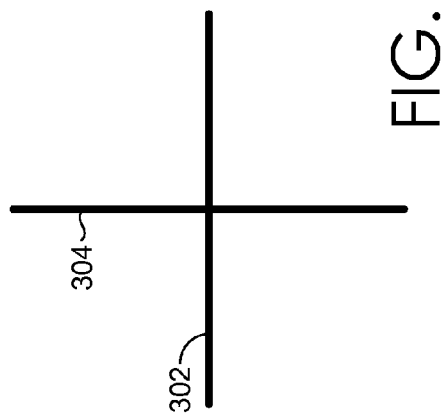
FIGS. 3A-3D depict exemplary orientations of pairs of dipole elements of an antenna, in accordance with embodiments herein.
Figure 3D:
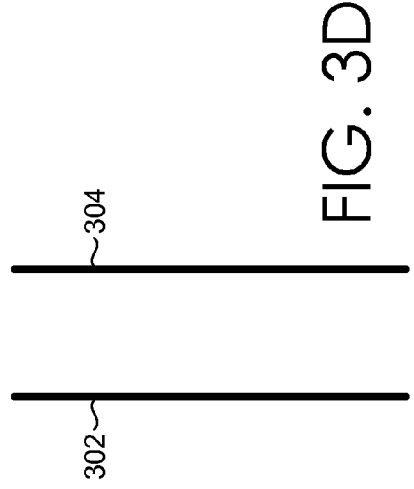
Figure 3A:
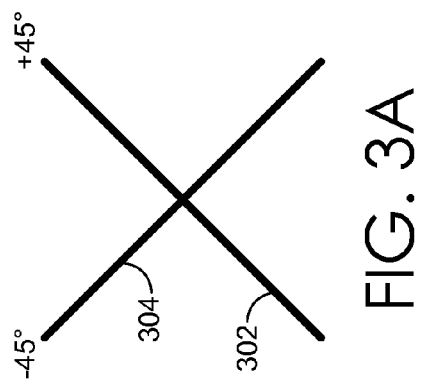

FIGS. 3A-3D depict exemplary orientations of pairs of dipole elements of an antenna, in accordance with embodiments herein. Beginning initially with FIG. 3A, a pair of dipole elements is shown. A first dipole element 302 is crossed with a second dipole element 304. The first dipole element 302 is in a +45 degree position from the horizontal, and the second dipole element 304 is in a −45 degree position from the horizontal. The orientation of the dipole elements in FIG. 3A is typically referred to as being cross-polarized, or slant. When dipole elements are cross-polarized, the angular orientation of the elements is around +45 degrees for one antenna element (e.g., the first dipole element 302) and +135 degrees (or −45 degrees) for the cross-polarized element (e.g., the second dipole element 304). This orientation has traditionally been used, as it has the same angle of an antenna when a user device is held to the ear of a subscriber during a voice call. By having the radiating elements (the antenna elements and the mobile device antenna) in the same plane, optimal transfer of signal energy occurs. However, as user devices become more frequently used for data (gaming, watching audio-visual content, viewing social media content or news content, etc.), the user device antenna may now be oriented vertically (i.e., at 90/270 degrees) or horizontally (i.e., at 0/180 degrees). The result is that the typical +45/−45 degree angular orientation of the cross-polarized antenna array elements may not provide optimal RF signal strength and/or quality to the user devices.

Figure 3C:
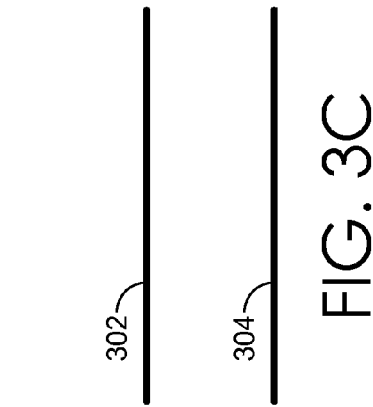

FIG. 3B illustrates the same pair of dipole elements as is shown in FIG. 3A. In this orientation, which is different from the orientation illustrated in FIG. 3A, the first dipole element 302 is horizontal (i.e., at 0/180 degrees), while the second dipole element 304 is vertical (i.e., at 90/270 degrees). FIG. 3C illustrates the same pair of dipole elements shown in FIGS. 3A and 3B, but here, both dipole elements 302 and 304 are horizontal (i.e., at 0/180 degrees), which will hereinafter be referred to as a horizontal parallel orientation. In some embodiments, the orientation of dipole elements illustrated in FIG. 3C may be used when a particular user device is farther away from the base station, or when a group of user devices are farther away from the base station. Horizontal parallel orientation may also be used when there are very few user devices in a particular geographical area, such as in a rural area. In FIG. 3D, the same pair of dipole elements 302 and 304 are illustrated, but both are vertical (i.e., at 90/270 degrees), which will hereinafter be referred to as a vertical parallel orientation. Vertical parallel orientation may be used when a user device or a group of user devices are close in distance to the base station, or when there are a large quantity of user devices in a particular geographical area, such as in an urban setting.

For each of FIGS. 3A-3D, only one pair of dipole elements is shown. However, it will be understood that an antenna may be comprised of multiple pairs of dipole elements. In fact, an antenna may be comprised of one or more dipole columns, where each column comprises one or more pairs of dipole elements. In one embodiment, each dipole column of the antenna operates at a different bandwidth. Additionally, each column may have one or more ports associated therewith, such as two ports in one embodiment. In this embodiment, a first port is associated with a first dipole element for each pair of dipole elements in that dipole column, while the second port is associated with a second dipole element for each pair of dipole elements in that dipole column.

FIG. 4 depicts a flow diagram of an exemplary method 400 of dynamically changing an orientation of dipole elements on an antenna associated with a wireless communications network, in accordance with an embodiment herein. Initially at block 410, angle information is received from a first user device. Angle information, in one embodiment, indicates the angle of arrival corresponding to the first user device. The user device may derive its own angle information by, for example, a compass, triangulation, an azimuth measurement, a combination thereof, or some other form of measurement. In one embodiment, angle information is received at a base station or other network component, and may be received from just one user device, or from multiple user devices. At block 412, based on at least the received angle information, it is determined to reorient the dipole elements of one or more pairs of dipole elements on the antenna from a first orientation to a second orientation. The first orientation may provide a different polarization of the one or more pairs of dipole elements than the second orientation. In addition to the angle information, other factors may be used to determine that the dipole elements are to change orientation. These other factors may include the type of data that the at least the first user device is requesting, the elevation of the at least the first user device compared to the elevation of the base station, the topology of an area corresponding to a location of the at least the first user device, or the distance of the at least the first user device from the base station are additionally received from the at least the first user device.

At block 414, by way of a signaling message communicated to a movement mechanism, causing the dipole elements of the one or more pairs of dipole elements to be moved to a position corresponding to the second orientation. The movement mechanism may comprise a motor that causes the dipole elements to move. For instance, the dipole elements may be movably mounted on a railing that allows the dipole elements to move to one of many different positions corresponding to different orientations. In one embodiment, an indication that the dipole elements have moved to a position corresponding to the second orientation may be received. Once the dipole elements have been moved to the position corresponding to the second orientation, the base station may communicate data and timing information to the user device. Different orientations that may be used include a horizontal parallel orientation, a vertical parallel orientation, a cross-polarized orientation, or a horizontal/vertical orientation.

As discussed herein, physically moving dipole elements to different positions corresponding to different orientations changes the polarization of the dipole elements to better match the polarization of the user device. By doing this, high speed data transfer from the base station to the user devices can be greatly enhanced.

In one embodiment, angle information may be received from at least a second user device. Based on this angle information, it may be determined to reorient the dipole elements on the antenna from the second orientation to a third orientation, where the second and third orientations provide different polarizations of the one or more pairs of dipole elements. In some cases, the orientation may change from a first orientation to a second orientation, then back to the first orientation. In this case, the first and third orientations may be the same.

FIG. 5 depicts a flow diagram of an exemplary method 500 of dynamically changing an orientation of dipole elements on an antenna associated with a wireless communications network, in accordance with an embodiment herein. At block 510, a reference signal is received at a base station from a user device indicating an angle of arrival corresponding to the user device. At block 512, it is algorithmically determined that a first pair of dipole elements having a first orientation is to be moved to have a second orientation. This determination may be based on, for example, the angle of arrival of the user device, a type of data that the user is requesting, an elevation of the user device, a topology of an area corresponding to a location of the user device, a distance of the user device from the base station, etc. The first pair of dipole elements may comprise a first dipole element and a second dipole element. In one embodiment, just one dipole element of the pair is moved when the orientation is changed, but in another embodiment, both dipole elements move when the orientation is changed. Also, as mentioned, when the first pair of dipole elements move, all other pairs of dipole elements in that same dipole column move to a position corresponding to the second orientation. At block 514, by way of a motorized element, the first pair of dipole elements is caused to be physically moved from the first orientation to the second orientation.

There may be many different ways that could be implemented to move the dipole elements to different positions corresponding to different orientations. In one embodiment, the dipole elements are movably coupled to a railing, allowing at least one dipole element of the first pair of dipole elements to move from a first position to a second position, which corresponding to the first orientation and the second orientation, respectively. In some embodiments, a motor, such as a digital stepper motor, may be used based on a received signal indicating that the dipole elements are to be moved to a different position. The motor, in one embodiment, is located at the base of the antenna or cell tower, and can work to move the antenna dipole elements to different positions, as discussed herein. The base station or some other network component is able to send signals to the motor. The antenna dipole elements or the entire antenna column may be on a mechanically installed mechanism for positioning and movement using a railing slide or small wheels. An electro mechanical pulley system may also or alternatively be involved to modify the position of the elements or columns when the output of the motor changes with respect to the command sent by the base station or other network component.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method carried out by at least one server having one or more processors for dynamically changing an orientation of dipole elements on an antenna associated with a wireless communications network, the method comprising:
   receiving angle information from at least a first user device, the angle information indicating the angle of arrival corresponding to the at least the first user device;
   based on at least the received angle information, determining to reorient the dipole elements of one or more pairs of dipole elements on the antenna from a first orientation to a second orientation, wherein the first orientation provides a different polarization of the one or more pairs of dipole elements than the second orientation; and
   by way of a signaling message communicated to a movement mechanism, causing the dipole elements of the one or more pairs of dipole elements to be moved to the second orientation.

2. The method of claim 1, further comprising receiving an indication that the dipole elements of the one or more pairs of dipole elements have been moved to the second orientation.

3. The method of claim 1, further comprising:
   receiving angle information from at least a second user device, the angle information indicating the angle of arrival corresponding to the at least the second user device;
   based on at least the received angle information, determining to reorient the dipole elements of the one or more pairs of dipole elements on the antenna from the second orientation to a third orientation, wherein the second orientation provides a different polarization of the one or more pairs of dipole elements than the third orientation; and
   by way of a signaling message communicated to the movement mechanism, causing the dipole elements of the one or more pairs of dipole elements to be moved to the third orientation.

4. The method of claim 3, wherein the first orientation is a same orientation as the third orientation.

5. The method of claim 1, further comprising once the dipole elements of the one or more pairs of dipole elements have been moved to the second orientation, communicating to the at least the first user device data and timing information.

6. The method of claim 1, wherein one or more of a type of data that the at least the first user device is requesting, an elevation of the at least the first user device, a topology of an area corresponding to a location of the at least the first user device, or a distance of the at least the first user device from the base station are additionally received from the at least the first user device.

7. The method of claim 1, wherein the angle information is received at a base station associated with the wireless communications network.

8. The method of claim 1, wherein the at least the first user device derives angle information using a compass, triangulation, or an azimuth measurement.

9. The method of claim 1, wherein causing the dipole elements of the one or more pairs of dipole elements to be moved to the second orientation enhances high speed data transfer from a base station to the at least the first user device.

10. The method of claim 1, wherein the first orientation and the second orientation are one of a horizontal parallel orientation, a vertical parallel orientation, a cross-polarized orientation, or a horizontal/vertical orientation.

11. The method of claim 10, wherein the vertical parallel orientation is used when there is a high density of user devices in a particular area, and wherein the horizontal parallel orientation is used when there is a low density of user devices in the particular area.

12. A non-transitory computer-storage media having computer-executable instructions embodied thereon that, when executed, perform a method for dynamically changing an orientation of dipole elements on an antenna associated with a wireless communications network, the method comprising:
   receiving a reference signal at a base station from a user device indicating an angle of arrival corresponding to the user device;
   based on the angle of arrival and one or more of a type of data that the user is requesting, an elevation of the user device, a topology of an area corresponding to a location of the user device, or a distance of the user device from the base station, algorithmically determining that a first pair of dipole elements having a first orientation is to be moved to have a second orientation; and by way of a motorized element, causing the first pair of dipole elements to be physically moved from the first orientation to the second orientation.

13. The non-transitory computer-storage media of claim 12, wherein the first pair of dipole elements comprises a first dipole element and a second dipole element.

14. The non-transitory computer-storage media of claim 13, wherein when the first pair of dipole elements is moved from the first orientation to the second orientation, both the first dipole element and the second dipole element are moved.

15. The media of claim 12, wherein when the first pair of dipole elements is moved from the first orientation to the second orientation, at least a second pair of dipole elements is also moved from the first orientation to the second orientation.

16. The non-transitory computer-storage media of claim 15, wherein the first pair of dipole elements and at least the second pair of dipole elements comprise a dipole column.

17. The non-transitory computer-storage media of claim 12, wherein when the first pair of dipole elements is moved from the first orientation to the second orientation, all pairs of dipole elements in a dipole column corresponding to the first pair of dipole elements are moved to the second orientation.

18. The non-transitory computer-storage media of claim 15, wherein the first pair of dipole elements are movably coupled to a railing, allowing at least one dipole element of the first pair of dipole elements to move from a first position to a second position, the first position and the second position corresponding to the first orientation and the second orientation, respectively.

19. A system for dynamically changing an orientation of a plurality of dipole elements that comprise an antenna associated with a wireless communications network, the system comprising:

a base station in the wireless communications network, the base station receiving angle information from at least one user device and determining, based on the received angle information, whether two or more antenna dipole elements of the plurality of dipole elements are to be moved from a first orientation to a second orientation;

the two or more antenna dipole elements whose position in relation to one another can be changed based on, at least, the angle information received at the base station;

a signal-receiving component that receives a signal from the base station instructing the position of at least one of the two or more antenna dipole elements to be changed; and a movement mechanism that causes, based on the received signal, the at least one of the two or more antenna dipole elements to be moved according to the second orientation.

20. The system of claim 19, further comprising a motor coupled to the movement mechanism, the motor causing the movement of the two or more antenna dipole elements.

* * * * *